United States Patent

Burnett et al.

[11] Patent Number: 5,816,665
[45] Date of Patent: Oct. 6, 1998

[54] COMPRESSION AND FLUID RETARDING VEHICLE BRAKING CONTROL SYSTEM

[75] Inventors: Steven Burnett, Peterlee; Alan D. Young; Peter F. Prillinger, both of Sunderland, all of United Kingdom

[73] Assignee: Caterpillar Inc., Peoria, Ill.

[21] Appl. No.: 783,421

[22] Filed: Jan. 10, 1997

[51] Int. Cl.$^6$ ............ B60T 13/74; B60K 41/20; F02D 13/04
[52] U.S. Cl. ............... 303/3; 303/15; 188/293; 477/185; 477/188; 123/322
[58] Field of Search .................. 123/318, 319, 123/320, 321, 322; 60/617, 618, 624, 712; 477/54, 59, 73, 118, 119, 185, 211; 475/113, 161; 188/293, 294, 296; 303/3, 15, 20

[56] References Cited

U.S. PATENT DOCUMENTS

| | | | |
|---|---|---|---|
| 4,314,487 | 2/1982 | Ahleu | 477/66 |
| 4,355,605 | 10/1982 | Robinson et al. | 123/320 |
| 4,882,906 | 11/1989 | Sekiyawa et al. | 60/624 |
| 5,121,607 | 6/1992 | George, Jr. | 60/618 |
| 5,121,723 | 6/1992 | Stepper et al. | 123/322 |
| 5,409,437 | 4/1995 | Steeby | 477/71 |
| 5,657,838 | 8/1997 | Vogelsang et al. | 188/154 |

*Primary Examiner*—Robert J. Oberleitner
*Assistant Examiner*—Chris Schwartz
*Attorney, Agent, or Firm*—David M. Masterson

[57] ABSTRACT

A retarder system for a vehicular drive train is disclosed. The retarder system includes a compression brake being adapted to operate in multiple stages to slow the speed of the engine and a fluid retarder being adapted to operate in multiple stages to absorb power from the drive train. A controller regulates the operational stages of the compression brake and the fluid retarder so that the compression brake and the fluid retarder operate in combination to slow the speed of the vehicle.

7 Claims, 2 Drawing Sheets

COMPRESSION AND FLUID RETARDING VEHICLE BRAKING CONTROL SYSTEM

DESCRIPTION

1. Technical Field

This invention relates generally to a control system that coordinates a compression braking system with that of a fluid retarding braking system.

2. Background Art

Vehicles such as on-highway trucks often use compression brakes to assist in slowing the vehicle, without operating the vehicle service brakes. A compression brake slows the vehicle by manipulating the intake and exhaust valves to remove energy from the engine. Typically, the compression brake permits air to enter the cylinder during the intake cycle, and allows the engine to compress the air as the piston moves toward top dead center. Compressing the air transfers work from the piston to the compressed air. That work is then released as the piston reaches top dead center by opening the exhaust valve. In this manner the work required to compress the air is then expelled and a corresponding retarding force is transmitted through the transmission to the rear wheels thereby assisting in slowing the vehicle.

Another method to slow the vehicle is via a fluid retarder within the drive train. Such retarders typically consist of closely spaced, rotatable rotors that are mounted on a shaft connected to the drive train. In order to condition the retarder for power absorption within the drive train, the rotors are contained within a housing filled with fluid. Movement of the rotors through the fluid converts horse power from the drive train into heat.

However, to provide for an improved degree of speed control of the vehicle, it is desirable to supplement the braking power of the engine compression braking system with the braking power of the fluid retarder system. The present invention is directed toward coordinating the engine compression braking system with the fluid retarder braking system.

DISCLOSURE OF THE INVENTION

In one aspect of the present invention, a retarder system for a vehicular drive train is disclosed. The retarder system includes a compression brake being adapted to operate in multiple stages to slow the speed of the engine and a fluid retarder being adapted to operate in multiple stages to absorb power from the drive train. A controller regulates the operational stages of the compression brake and the fluid retarder so that the compression brake and the fluid retarder operate in combination to slow the speed of the vehicle.

BRIEF DESCRIPTION OF THE DRAWINGS

For a better understanding of the present invention, reference may be made to the accompanying drawings in which.

BEST MODE FOR CARRYING OUT THE INVENTION

Figure 1:
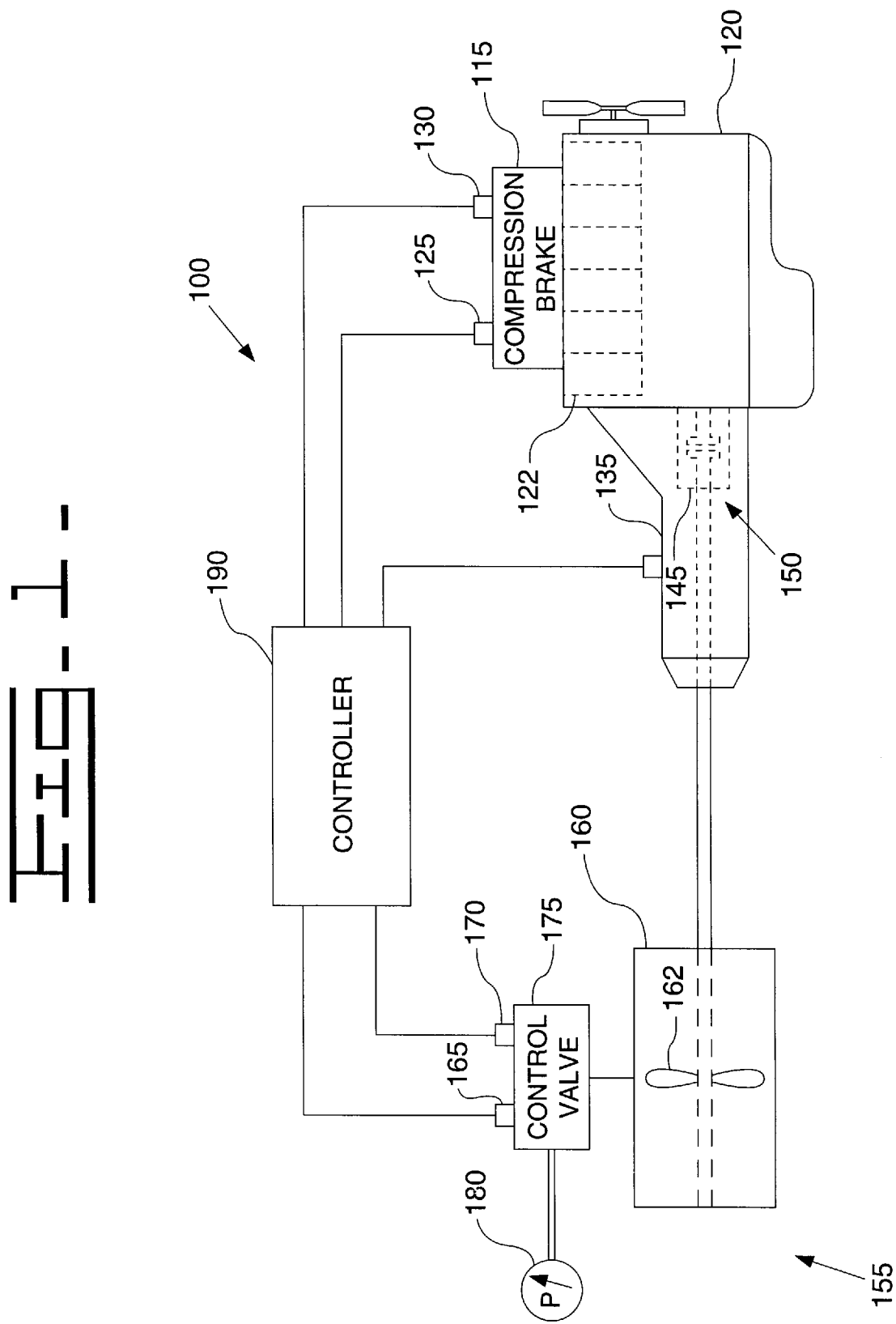
FIG. 1 illustrates a block diagram of a control system for an engine compression and fluid retarder braking system.

Reference is first made to FIG. 1, which shows an electronic control system 100 that is used to slow the speed of a vehicle. The electronic control system 100 includes a compression brake 115 that is connected to an internal combustion engine 120 having a plurality of cylinders 122. Preferably, the compression brake 115 is similar to that manufactured by Jake Brake. The compression brake 115 includes first and second solenoids 125,130 that control fluid pressure to actuate certain components in the compression brake 115 to cause the compression brake 115 to be enabled in a manner well known in the art. Such compression brakes are well known in the art and need not be further described.

The engine 120 is connected to a transmission 135 that drives a rear axle (not shown) which in turn drives the rear wheels or other propulsion means of the vehicle. A torque converter 145 that is equipped with a lock-up clutch 150 transmits torque between the engine 120 and the transmission 135. A fluid retarder 155 that includes a fluid housing 160 and an internal rotor 162, coupled for rotation with the power input shaft of the transmission 135, is additionally provided to slow the vehicle speed. The fluid retarder 155 includes first and second solenoids 165,170 that control the actuation of a control valve 175 that regulates pressurized fluid flow from a pump 180 to the fluid housing 160. The rotor 162 moves through the fluid; thereby, absorbing power from the drive train and slowing the vehicle in a well known manner. A fluid conduit (not shown) provides an exit for the fluid contained in the retarder housing 160 to a tank (also not shown). Such a fluid retarder 155 is well known in the art and its operation will not be discussed further.

An electronic controller 190 provides signals to actuate the respective solenoids 125,130,165,170.

Figure 2:
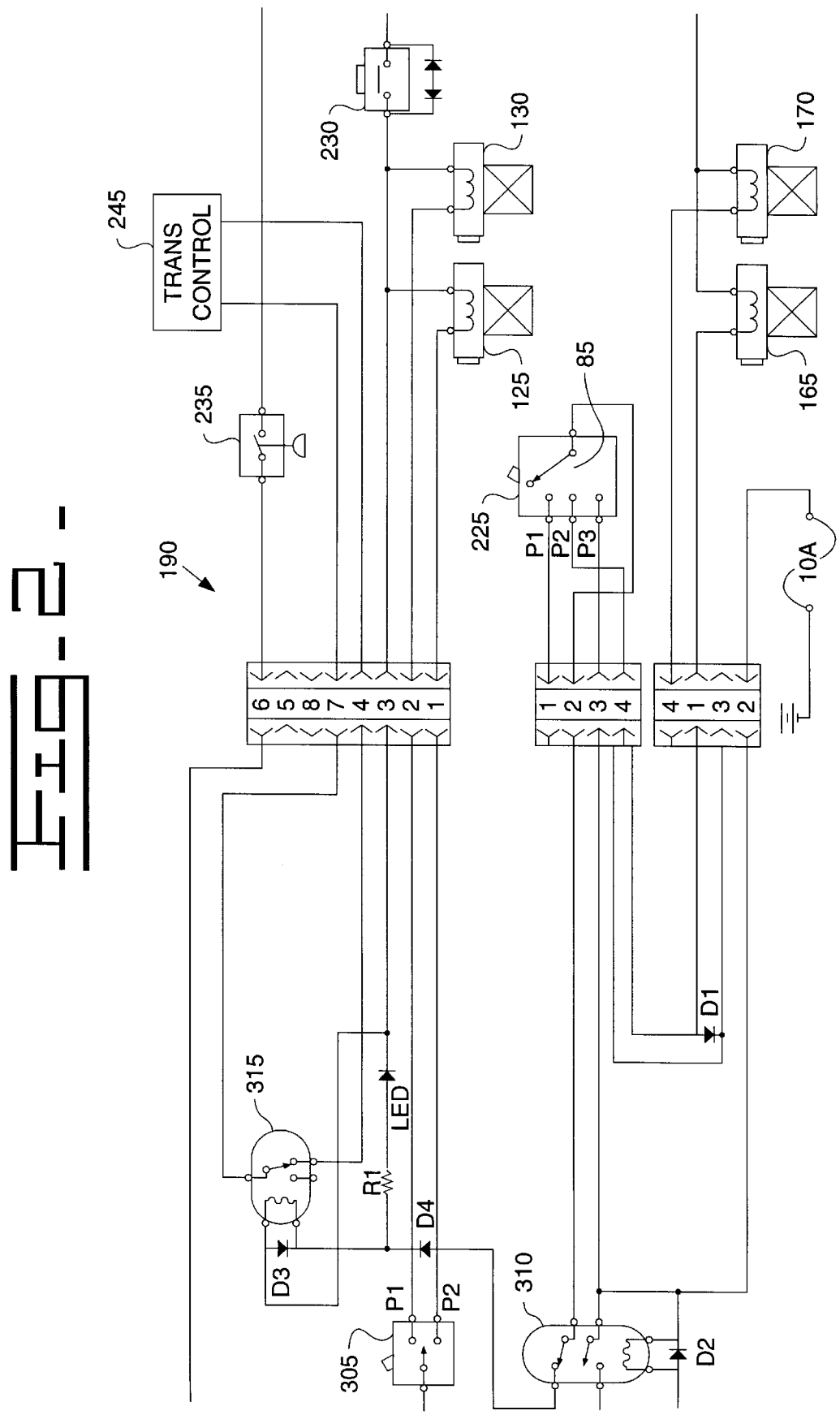
FIG. 2 illustrates an electrical schematic of the control system.

Reference is now made to FIG. 2, which shows a block diagram of the electronic circuitry associated with the present invention including the controller 190. First and second compression brake solenoids 125,130 control the various stages associated with the compression brake 115. Similarly, first and second retarder solenoids 165,170 control the various stages associated with the fluid retarder 155. The controller 190 controls the compression brake and retarder solenoids in a manner that provides for the respective braking systems to work together.

A retarder level switch 225 is selectable to one of three positions that controls the various stages of the retarder. In a preferred embodiment the retarder level switch 225 includes a three-position switch 85. Each of the three positions of switch 225 corresponds to a specific braking level output from the fluid retarder 155. For example, position one of the retarder level switch 225 causes the retarder to have negligible effect, or in other words, position one provides for only a small amount of fluid to circulate within the retarder to lubricate and cool the moving parts therein; position two of the retarder level switch 225 causes the first retarder solenoid 165 to be energized in order to fill the retarder fluid housing 160 at a first predetermined amount of fluid flow; and position three of the retarder level switch 225 causes the second retarder solenoid 170 to be energized in order to fill the retarder fluid housing 160 with a second predetermined amount of fluid flow. Position two is said to control the retarder 155 at a stage one, which represents a predetermined amount of drive line power absorption. Position three is said to control the retarder 155 at stage two, which represents a greater amount of drive line power absorption than stage one. Although two retarding solenoids 165,170 are described, it will be recognized to those skilled in the art that the number of solenoids may be readily and easily varied without deviating from the scope of the present invention.

A normally open throttle position switch 230 produces a retarding signal in response to the operator fully releasing a throttle pedal (not shown) preferably located in the operator compartment of the vehicle. A normally open lock-up switch 235 is closed when the lock-up clutch 150 is locked-up and produces a lock-up signal in response to the lock-up clutch being locked-up 150. The electronic controller 190 receives the various signals and produces control signals to energize the compression and retarder solenoids 125,130,165,170. The electronic controller 190 additionally produces a control signal to a transmission control device 245 to raise the transmission shift points to keep the rotational speed of the engine at a high r.p.m. for maximum retardation.

A compression braking level switch 305 is selectable to one of two positions that controls the various stages of the compression brake 115. Each switch position corresponds to a specific braking level output from the compression brake 115. For example, position one of the compression braking level switch 305 causes the first compression solenoid 125 to energize; thereby, providing for three engine cylinders to perform the braking. Position two of the compression braking level switch 305 provides for both the first and second compression solenoids 125,130 to energize; thereby, providing for six engine cylinders to perform the braking. Note, however, that the compression signals will not be produced unless the throttle switch 330 is closed. Position one is referred to as stage one of the compression brake 115 and position two is referred to as stage two of the compression brake 115. As is known to those skilled in the art, increasing the number of engine cylinders performing engine braking increases the braking force exerted by the engine through the transmission to the rear wheels. Although two compression braking solenoids 125,130 are described, it will be recognized to those skilled in the art that the number of solenoids may be readily and easily varied without deviating from the scope of the present invention.

First and second relays 310,315 energize in response to the lock-up switch 235 being closed. The first and second relays 310,315 provide for the compression brake 115 and the fluid retarder 155 to operate in tandem. In response to the lock-up switch 235 being closed, the first relay 310 energizes and switches its contacts, which energizes the LED to signal the operator that the retarding system is operational. As long as the throttle switch 230 is closed, the operator can control the compression brake 115 at stages one or two via the compression braking level switch 305; or the operator can control the retarder 155 at stages one or two in combination with the compression brake at stage two via the retarder switch 225. Further, in response to the first relay 310 being energized, the second relay 315 energizes, which sends a transmission control signal to the transmission controller 245 to raise the transmission shift points to keep the rotational speed of the engine at a high r.p.m. for maximum retardation.

Thus, while the present invention has been particularly shown and described with reference to the preferred embodiment above, it will be understood by those skilled in the art that various additional embodiments may be contemplated without departing from the spirit and scope of the present invention. For example, although discrete analog circuitry is shown, it will be apparent to those skilled in the art that digital circuitry may readily be substituted for the discrete analog circuitry.

INDUSTRIAL APPLICABILITY

The present invention is directed toward supplementing the braking power associated with the compression brake 115 with that of the fluid retarder 155. The circuitry associated with electronic controller 190 provides for the compression brake 115 to be controlled independent of the fluid retarder 155. However, the fluid retarder 155 will supplement the compression braking brake 115 when the retarder level switch 225 is at positions two or three. For example, when the compression level switch 305 is operated alone, the compression braking level switch 305 alone controls the operational stages of the compression brake 115. However, when the retarder level switch 225 is moved to positions one, two, or three, the relay 310 energizes the compression solenoids 125,130 to operate the compression brake at stage two. So, when the retarder level switch 225 is at the first position, the controller 190 controls the compression brake 115 at stage two. When the retarder level switch 225 is at the second position, the controller 190 controls the compression brake 115 at stage two and the retarder 155 at stage one. Finally, when the retarder level switch 225 is at the third position, the controller 190 controls the compression brake 115 at stage two and the retarder 155 at stage two. Moreover, the controller 190 sends a control signal to the transmission control device 245 to raise the transmission shift points in response to either the retarder 155 or the compression brake 115 being enabled.

Other aspects, objects and advantages of the present invention can be obtained from a study of the drawings, the disclosure and the appended claims.

It is claimed:

1. A retarder system for a vehicular drive train being driven by an internal combustion engine via a transmission, the engine having a plurality of cylinders, comprising:
    a compression brake adapted to operate in multiple stages to slow the speed of the engine;
    a fluid retarder adapted to operate in multiple stages to absorb power from the drive train, the fluid retarder including a fluid housing and an internal rotor, coupled for rotation with the vehicular drive train; and
    a controller that is electrically connected to the compression brake and the fluid retarder, the controller being adapted to control the operational stages of the compression brake and the fluid retarder so that the compression brake and the fluid retarder operate in combination to slow the speed of the vehicle.

2. A retarder system, as set forth in claim 1, wherein the compression brake includes first and second solenoids to control the compression brake stages.

3. A retarder system, as set forth in claim 2, wherein the fluid retarder includes first and second solenoids to control the retarder stages.

4. A retarder system, as set forth in claim 3, the controller including a compression braking level switch being selectable to a plurality of positions representing multiple stages of the compression brake, position one of the compression braking level switch representing the first stage of the compression brake which causes the first compression solenoid to energize to provide the compression brake with three engine cylinders to perform the braking, position two of the compression braking level switch representing the second stage of the compression brake causing the first and second compression solenoids to energize to provide the compression brake with six engine cylinders to perform the braking.

5. A retarder system, as set forth in claim 4, the controller including a hydraulic retarder level switch being selectable to a plurality of positions representing the multiple stages of the fluid retarder, position one of the retarder level switch causes the retarder to have negligible absorbing effect, position two of the retarder level switch representing the first stage of the retarder, which causes the first retarder solenoid to be energized in order to fill the retarder fluid housing at a first predetermined amount of fluid flow; and position three of the retarder level switch representing the second stage of the retarder, which causes the second retarder solenoid to be energized in order to fill the retarder fluid housing with a second predetermined amount of fluid flow.

6. A retarder system, as set forth in claim 5, the controller including a first relay that energizes the first and second compression solenoids to provide for the compression brake to be operated at stage two in response to the retarder level switch being moved to positions one, two, or three.

7. A retarder system, as set forth in claim 6, the controller including a second relay that delivers a control signal to the transmission to raise the transmission shiftpoints in response to either the retarder or the compression brake being enabled.

* * * * *